US012132219B2

(12) United States Patent
Yamashiro

(10) Patent No.: US 12,132,219 B2
(45) Date of Patent: Oct. 29, 2024

(54) POWER SUPPLY DEVICE, ELECTRIC VEHICLE AND POWER STORAGE DEVICE INCLUDING POWER SUPPLY DEVICE, AND METHOD OF MANUFACTURING POWER SUPPLY DEVICE

(71) Applicant: SANYO Electric Co., Ltd., Osaka (JP)

(72) Inventor: Go Yamashiro, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 506 days.

(21) Appl. No.: 17/439,856

(22) PCT Filed: Dec. 20, 2019

(86) PCT No.: PCT/JP2019/050064
§ 371 (c)(1),
(2) Date: Sep. 16, 2021

(87) PCT Pub. No.: WO2020/202663
PCT Pub. Date: Oct. 8, 2020

(65) Prior Publication Data
US 2022/0190431 A1    Jun. 16, 2022

(30) Foreign Application Priority Data

Mar. 29, 2019    (JP) ................................. 2019-066826

(51) Int. Cl.
*H01M 50/264* (2021.01)
*B60K 1/04* (2019.01)
(Continued)

(52) U.S. Cl.
CPC ............ *H01M 50/264* (2021.01); *B60K 1/04* (2013.01); *B60L 53/60* (2019.02); *H01M 10/44* (2013.01);
(Continued)

(58) Field of Classification Search
CPC .. H01M 50/264; H01M 10/44; H01M 50/209; H01M 50/224; H01M 50/249;
(Continued)

(56) References Cited

U.S. PATENT DOCUMENTS 10,249,866 B2 *    4/2019   Seki ..................... H01M 10/613
11,901,582 B2 *    2/2024   Terauchi ............. H01M 50/502
(Continued)

FOREIGN PATENT DOCUMENTS

JP      2012-181970      9/2012
JP      2015-187911      10/2015
(Continued)

OTHER PUBLICATIONS

International Search Report of PCT application No. PCT/JP2019/050064 dated Mar. 17, 2020.
(Continued)

*Primary Examiner* — Jacob B Meyer
(74) *Attorney, Agent, or Firm* — WHDA, LLP

(57) ABSTRACT

A power supply device includes a battery stack body in which a plurality of secondary battery cells are stacked, a pair of end plates covering both end surfaces of the battery stack body, and a plurality of fastening members disposed on the side surface of the battery stack body and fasten the end plates to each other. Fastening member includes plate-shaped bar extended in a stack direction of the secondary battery cells, and locking blocks fixed to both ends of plate-shaped bar. Locking block is formed to be thicker than plate-shaped bar, is joined to an end surface of plate-shaped bar, and protrudes toward an outer peripheral surface of the end plate. The end plate is provided with a stopper portion abutting on locking block on a part close to the battery stack body of a fitting portion to which locking block is guided,
(Continued)

and locking block is locked to the stopper portion to fasten the end plate with fastening member.

20 Claims, 11 Drawing Sheets

(51) Int. Cl.
*B60L 53/60* (2019.01)
*H01M 10/44* (2006.01)
*H01M 50/209* (2021.01)
*H01M 50/224* (2021.01)
*H01M 50/249* (2021.01)
*H01M 50/262* (2021.01)

(52) U.S. Cl.
CPC ....... *H01M 50/209* (2021.01); *H01M 50/224* (2021.01); *H01M 50/249* (2021.01); *H01M 50/262* (2021.01); *H01M 2220/20* (2013.01)

(58) Field of Classification Search
CPC .. H01M 50/262; H01M 2220/20; B60K 1/04; B60L 53/60
See application file for complete search history.

(56) References Cited

U.S. PATENT DOCUMENTS

| | | | | |
|---|---|---|---|---|
| 2013/0009464 A1* | 1/2013 | Firehammer | ......... | H02J 7/0031 307/140 |
| 2013/0244089 A1* | 9/2013 | Shimizu | ................ | H01M 50/24 429/176 |
| 2014/0113171 A1* | 4/2014 | Schaefer | ........... | H01M 10/6555 165/185 |
| 2015/0024253 A1* | 1/2015 | Noh | .................... | H01M 50/209 429/156 |
| 2015/0333305 A1* | 11/2015 | Seki | .................... | H01M 10/625 429/152 |
| 2016/0036022 A1* | 2/2016 | Tononishi | ........... | H01M 10/658 429/53 |
| 2020/0099027 A1 | 3/2020 | Ishibashi et al. | | |
| 2021/0013469 A1* | 1/2021 | Naito | .................. | H01M 50/264 |
| 2021/0091349 A1* | 3/2021 | Terauchi | ............... | H01M 10/46 |
| 2022/0181740 A1* | 6/2022 | Yamashiro | ............... | B60K 1/04 |
| 2022/0190421 A1* | 6/2022 | Yamashiro | .......... | H01M 50/242 |
| 2022/0190422 A1* | 6/2022 | Yamashiro | .......... | H01M 50/262 |
| 2022/0190431 A1* | 6/2022 | Yamashiro | .............. | B60L 50/64 |

FOREIGN PATENT DOCUMENTS

| | | |
|---|---|---|
| JP | 2015-220117 | 12/2015 |
| WO | 2018/235556 A1 | 12/2018 |

OTHER PUBLICATIONS

English Translation of Chinese Search Report dated Aug. 5, 2023 for the related Chinese Patent Application No. 201980094925.8.

* cited by examiner

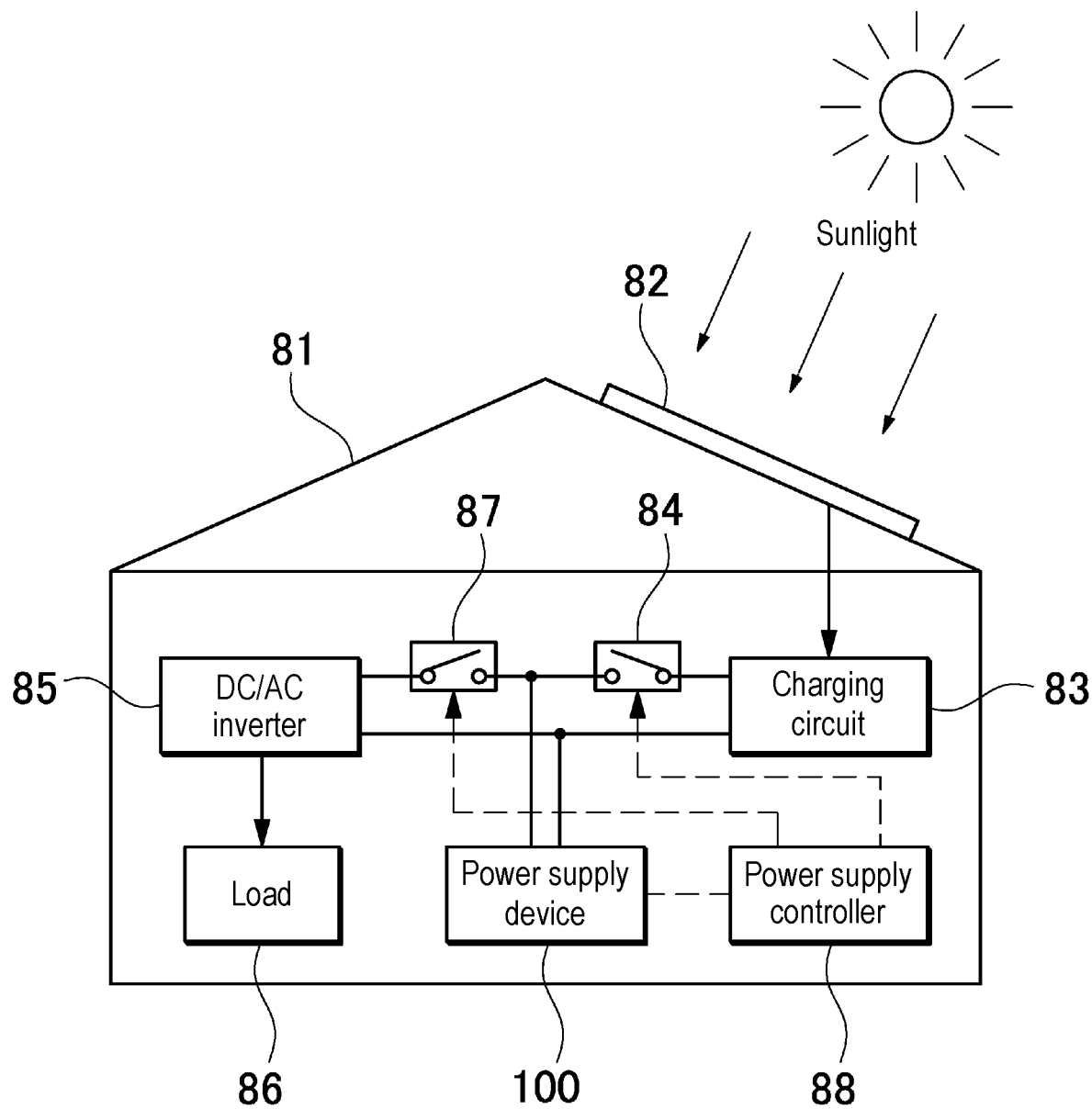

POWER SUPPLY DEVICE, ELECTRIC VEHICLE AND POWER STORAGE DEVICE INCLUDING POWER SUPPLY DEVICE, AND METHOD OF MANUFACTURING POWER SUPPLY DEVICE

CROSS-REFERENCE TO RELATED APPLICATIONS

This application is a U.S. national stage application of the PCT International Application No. PCT/JP2019/050064 filed on Dec. 20, 2019, which claims the benefit of foreign priority of Japanese patent application No. 2019-066826 filed on Mar. 29, 2019, the contents all of which are incorporated herein by reference.

TECHNICAL FIELD

The present invention relates to a power supply device in which end plates disposed at both ends of a battery stack body in which a plurality of secondary battery cells are stacked are coupled with a fastening member, an electric vehicle and a power storage device that are provided with the power supply device, and a method of manufacturing a power supply device.

BACKGROUND ART

A typical power supply device includes a battery stack body including a plurality of prismatic battery cells, a pair of end plates disposed on both end surfaces of the battery stack body, and a fastening member such as a binding bar coupling the pair of end plates (see PTL 1). By binding the battery stack body using the end plates and the binding bar, this power supply device can assemble the battery stack body including the plurality of prismatic battery cells.

CITATION LIST

Patent Literature

PTL 1: Unexamined Japanese Patent Publication No. 2015-220117

SUMMARY OF THE INVENTION

In the power supply device of PTL 1, since the battery stack body including the plurality of prismatic battery cells is assembled via the binding bar and the end plate, expansion of the plurality of prismatic battery cells constituting the battery stack body is suppressed. That is, since expansion of the prismatic battery cells is suppressed via the binding bar and the end plate, a large force is applied to the binding bar and the end plate.

On the other hand, each prismatic battery cell has a tendency that, when an attempt is made to increase the energy density per volume or the energy density per weight, a dimensional change accompanying charge and discharge or deterioration increases. The load applied to the binding bar and the end plate is caused by the expansion amount of the prismatic battery cell. Therefore, when a prismatic battery cell having a large dimensional change accompanying the expansion amount is used, a strong load is applied to the end plate and the binding bar at the time of expansion of the prismatic battery cell in the configuration of the power supply device of PTL 1. As a result, a strong shear stress acts on the joint part between the binding bar and the end plate, which may cause breakage.

The present invention is developed for the purpose of solving the above disadvantages, and an object of the present invention is to provide a technology that can prevent deformation or breakage of a fastening member for fastening a battery stack body in which a plurality of secondary battery cells are stacked, and to enhance a coupling strength with an end plate.

A power supply device according to an aspect of the present invention includes: battery stack body 10 in which a plurality of secondary battery cells 1 each including prismatic exterior can 1a are stacked; a pair of end plates 3 covering both end surfaces of battery stack body 10 in a stack direction; and a plurality of fastening members 4 disposed on an opposing side surface of battery stack body 10 to fasten end plates 3 to each other. Each of the plurality of fastening members 4 includes plate-shaped bar 6 extended in the stack direction of secondary battery cells 1 and locking blocks 5 fixed to both ends in the longer direction of plate-shaped bar 6. Locking block 5, which is formed thicker than plate-shaped bar 6, is joined to the end surface of plate-shaped bar 6, and protrudes toward the outer peripheral surface of end plate 3 relative to the inner side surface of plate-shaped bar 6. End plate 3 has, on an outer peripheral surface, fitting portion 3a to which locking block 5 is guided, and is provided with stopper portion 3b that abuts on locking block 5 on a part close to battery stack body 10 of fitting portion 3a. In the power supply device, locking block 5 is locked to stopper portion 3b, and end plate 3 is fastened by fastening member 4.

An electric vehicle according to an aspect of the present invention includes power supply device 100, traveling motor 93 to which electric power is supplied from power supply device 100, vehicle body 91 on which power supply device 100 and motor 93 are mounted, and wheels 97 driven by motor 93 to cause vehicle body 91 to travel.

A power storage device according to an aspect of the present invention includes power supply device 100 and power supply controller 88 that controls charging and discharging of power supply device 100, and power supply controller 88 enables charging of secondary battery cells 1 with power from the outside and perform control so as to charge secondary battery cells 1.

A method of manufacturing a power supply device includes battery stack body 10 in which a plurality of secondary battery cells 1 each including prismatic exterior can 1a are stacked, a pair of end plates 3 covering both end surfaces of battery stack body 10 in a stack direction, and a plurality of fastening members 4 each disposed on an opposing side surface of battery stack body 10 to fasten end plates 3 to each other, and the method includes: a step of linearly joining locking blocks 5 formed to be thicker than plate-shaped bar 6 to obtain fastening members 4 on both ends in a longer direction of plate-shaped bar 6 extended in a stack direction of secondary battery cells 1; and a step of covering both end surfaces of battery stack body 10 with the pair of end plates 3 in which stopper portion 3b for locking locking block 5 is formed, and fastening end plates 3 to each other by fastening member 4.

According to the above configuration, while the pair of end plates can be securely fastened by locking the locking blocks provided at both ends of the fastening member to the stopper portions of the end plates, the plate-shaped bar and

BRIEF DESCRIPTION OF DRAWINGS

FIG. 11 is a block diagram showing an example of application to a power supply device for power storage.

DESCRIPTION OF EMBODIMENTS

Figure 1:
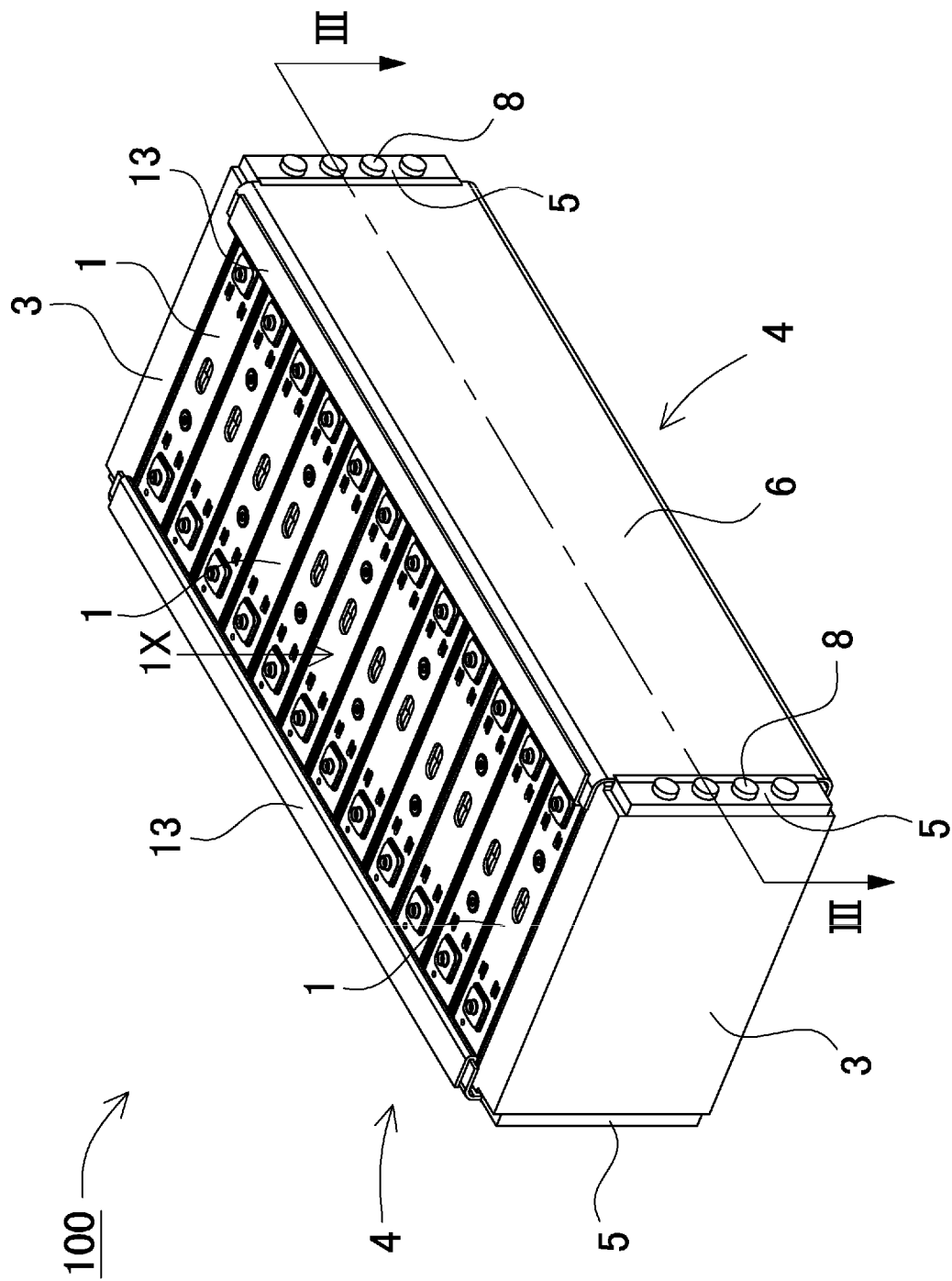
FIG. 1 is a perspective view showing a power supply device according to a first exemplary embodiment.

First, one attention point of the present invention will be described. A power supply device in which a large number of battery cells are stacked is configured to bind a plurality of battery cells by coupling end plates disposed at both ends of a battery stack body including a plurality of battery cells with a fastening member such as a binding bar. When the plurality of secondary battery cells are bound via a highly rigid end plate and a binding bar, expansion, deformation, relative movement, malfunction due to vibration, and the like of battery cells 1 due to charging and discharging and deterioration are suppressed. In the power supply device described above, the area of the stack surface of each battery cell is set to about 100 square centimeters, and a force as strong as equal to or greater than 1 ton (e.g., several tons) may act on the end plate by suppressing expansion of the battery cells. Therefore, an extremely strong tensile force acts, via the end plate, on the binding bar fixed to the end plate.

In a conventional power supply device in which both ends of the battery stack body are fixed by the end plate, a bent piece in which an end part of the binding bar is bent inward is fixed to an outer surface of the end plate. In the structure described above, the end part of the binding bar of the metal plate is bent to form a bent piece, and the bent piece is fixed to the outer surface of the end plate. Therefore, the bent piece becomes a metal plate having the same thickness as that of the binding bar. As the binding bar, a metal plate having tensile strength that withstands a tensile force generated by the expansion force of the battery cells is used. The tensile strength of the metal plate is considerably stronger than the bending strength, and for example, a metal plate of about 1 mm to 2 mm is used for the binding bar. The bending stress acts on the bent piece fixed to the outer surface of the end plate by the tensile force of the binding bar, but the bending stress of the metal plate used for the end plate is considerably weaker than the tensile stress, and the bent portion of the bent piece is deformed and broken beyond the proof stress and the breaking strength by the bending stress acting on the bent piece. Unless there is a gap between the bent portion of the bent piece and the end plate, the inner surface of the bent portion comes into contact with the corner part of the end plate, and assembly cannot be performed.

As described above, in the binding bar provided with the bent piece by bending the end part, due to an increase in tensile force applied to the binding bar, a stronger stress is locally concentrated on the inside of a bent portion of the binding bar and the end plate corner part, thereby causing deformation and damage of the binding bar and the end plate.

Therefore, as a structure in which a pair of end plates disposed at both end parts in a stack direction of a battery stack body are fastened by fastening members, the present applicant has developed a power supply device having a structure in which a locking block is locked and fastened to a step portion of the end plate by using a fastening member having a flat plate-shaped fastening main surface extended in the stack direction of the battery stack body and the locking block provided on this fastening main surface and protruding toward an opposite surface to an outer peripheral surface of the end plate. In the power supply device of this structure, the locking block is locked and fixed to the end plate. Therefore, unlike the L-shaped portion of the conventional fastening member that deforms due to bending stress, the fastening member can be fixed to the end plate without the fastening member being deformed by the locking block and the step portion of the end plate. In particular, since the locking block is locked to the step portion of the end plate to prevent positional displacement, it is possible to prevent deformation of the fastening member and the end plate due to a strong tensile force acting on the fastening member and to suppress movement of the end plate.

On the other hand, in the fastening member including the fastening main surface and the locking block, it is necessary to fix the fastening main surface and the locking block. Spot welding is used for joining the fastening main surface formed of a metal plate and the locking block. However, in the spot welding, since the fastening main surface and the locking block are locally joined, there is a problem that a large shear stress concentrates on this joining part at the time of expansion of the battery cells. For this reason, there has been a demand for a fastening member that enhances the coupling strength between the locking block and the fastening main surface to withstand the tensile force generated by the expansion force of the battery cells.

A power supply device of an aspect of the present invention may be specified by the following configurations. The power supply device includes: a battery stack body in which a plurality of secondary battery cells each including a prismatic exterior can are stacked; a pair of end plates covering both end surfaces of the battery stack body in a stack direction; and a plurality of fastening members each disposed on an opposing side surface of the battery stack body to fasten the end plates to each other, in which each of the plurality of fastening members includes a plate-shaped bar stretched in a stack direction of the secondary battery cells, and locking blocks fixed to both ends in a longer direction of the plate-shaped bar, each locking block is formed to be thicker than the plate-shaped bar, is joined to an end surface of the plate-shaped bar, and protrudes toward an outer peripheral surface of the end plate relative to an inner surface of the plate-shaped bar, the end plate has, on an outer peripheral surface, a fitting portion to which the locking block is guided, and is provided with a stopper portion that abuts on the locking block on a part close to the battery stack body of the fitting portion, and the locking block is locked to the stopper portion to fasten the end plate with the fastening member.

According to the above configuration, the fastening member for fastening the pair of end plates includes the plate-shaped bar stretched in the stack direction of the secondary battery cells and the locking blocks fixed to both ends of the plate-shaped bar, and by joining the locking blocks formed to be thicker than the plate-shaped bar to both end surfaces of the plate-shaped bar, each locking block can protrude toward the outer peripheral surface of the end plate to be locked to the end plate, and the plate-shaped bar and the locking blocks having different thicknesses can be reliably coupled to each other to achieve excellent coupling strength. In particular, with this fastening member, while the plate-shaped bar is made thin to ensure stretchability and is caused to follow expansion of the secondary battery cells, each locking block locked to the stopper portion of the end plate is made thick to enhance the resistance against the shear stress.

In a power supply device according to another aspect of the present invention, each locking block and the end surface of the plate-shaped bar are joined in a continuous linear shape. With the above configuration, by performing continuous linear joining, it is possible to obtain a joint strength with higher strength and higher reliability as compared with a point-like joining such as spot welding.

In a power supply device according to another aspect of the present invention, each locking block and an end surface of a plate-shaped bar are joined by laser welding or metal inert gas (MIG) welding. With the above configuration, by welding the joint part between each locking block and the plate-shaped bar in a continuous linear shape, it is possible to join metals having different thicknesses to each other with higher coupling strength.

In a power supply device according to another aspect of the present invention, the joint part between each locking block and the plate-shaped bar is formed in the same plane on the outer surface of the fastening member. With the above configuration, it is possible to cause the locking block to protrude with a predetermined protrusion amount with respect to the plate-shaped bar on the inner surface of the fastening member while making the joint part between the locking block and the plate-shaped bar have a beautiful planar appearance on the outer surface of the fastening member.

In a power supply device according to another aspect of the present invention, the locking block is fixed to an outer peripheral surface of an end plate via a plurality of bolts.

In a power supply device according to another aspect of the present invention, protrusion amount (d) of the locking block with respect to the inner surface of the plate-shaped bar is set to be larger than height (h) of the stopper portion to form a gap between the tip end surface of the stopper portion and the inner surface of the plate-shaped bar. With the above configuration, there is a feature that the opposing surface on a part close to the end plate of the locking block is brought into close contact with the side surface that is the bottom surface of the fitting portion of the end plate, and the locking block can be reliably locked to the stopper portion.

In a power supply device according to another aspect of the present invention, the plate-shaped bar and the locking block are any of iron, an iron alloy, SUS, aluminum, an aluminum alloy.

In a power supply device according to another aspect of the present invention, any one or both of upper and lower end edge parts of the plate-shaped bar are bent inward to form a bent piece that covers upper and lower surfaces of the battery stack body.

In a power supply device according to another aspect of the present invention, the locking block is higher in rigidity than the plate-shaped bar, and the plate-shaped bar is higher in stretchability than the locking block.

Furthermore, a method of manufacturing a power supply device according to an aspect of the present invention may be specified by the following method. A method of manufacturing a power supply device includes a battery stack body in which a plurality of secondary battery cells each including a prismatic exterior can are stacked, a pair of end plates covering both end surfaces of the battery stack body in a stack direction, and a plurality of fastening members each disposed on an opposing side surface of the battery stack body to fasten the end plates to each other, and the method includes: a step of obtaining the fastening members by linearly joining a locking block formed to be thicker than a plate-shaped bar on both ends in a longer direction of the plate-shaped bar extended in a stack direction of the secondary battery cells; and a step of covering both end surfaces of the battery stack body with a pair of end plates in which the stopper portion for locking the locking block is formed, and fastening the end plates to each other by the fastening member.

Thus, the pair of end plates provided with the stopper portion for locking the locking block can be reliably fastened to each other by the fastening member in which the locking block is fixed to both ends of the plate-shaped bar extended in the stack direction of the secondary battery cells. In the step of obtaining the fastening member, by linearly joining the locking block formed to be thicker than the plate-shaped bar on both ends of the plate-shaped bar, it is possible to reliably couple to each other the plate-shaped bar and the locking block having different thicknesses, and to achieve excellent coupling strength. In particular, by performing continuous linear joining, it is possible to obtain a joint strength with higher strength and higher reliability as compared with a point-like joining such as spot welding.

In a method of manufacturing a power supply device according to another aspect of the present invention, the step of obtaining a fastening member includes a step of joining by welding a locking block to an end surface of a plate-shaped bar. With the above configuration, metals having different thicknesses can be joined together with higher reliability than that of spot welding or the like.

Exemplary embodiments of the present invention will be described below with reference to the drawings. However, the exemplary embodiments described below are examples for embodying the technical idea of the present invention, and the present invention is not limited to the following. In addition, the present specification does not specify the members shown in the claims as the members of the embodiment in any way. In particular, unless otherwise specified, dimensions, materials, shapes, relative arrangements, and the like of the components described in the exemplary embodiments are not intended to limit the scope of the present invention thereto, but are merely illustrative examples. Note that sizes, positional relationships, and the like of members illustrated in the drawings may be exaggerated for clarity of description. Furthermore, in the following description, the identical names and reference numerals indicate the identical members or members of the same nature, and detailed description thereof will be omitted as appropriate. Furthermore, each element constituting the present invention may be achieved in an aspect in which a plurality of elements include the identical member and one member serves as the plurality of elements, or conversely, can be achieved with a function of one member being shared by a plurality of members. In addition, some contents described in some examples and exemplary embodiments can be used in another example, exemplary embodiment, and the like.

The power supply device according to the exemplary embodiment is used for various applications such as a power supply that is mounted on an electric vehicle such as a hybrid vehicle or an electric vehicle and supplies electric power to a traveling motor, a power supply that stores generated power of natural energy such as solar power generation and wind power generation, and a power supply that stores midnight electric power. The power supply device according to the exemplary embodiment is used as a power supply suitable for high-power, high-current applications in particular. In the following example, an exemplary embodiment will be described in which the power supply device according to the exemplary embodiment is applied to a power supply device for driving an electric vehicle.

First Exemplary Embodiment

Figure 2:
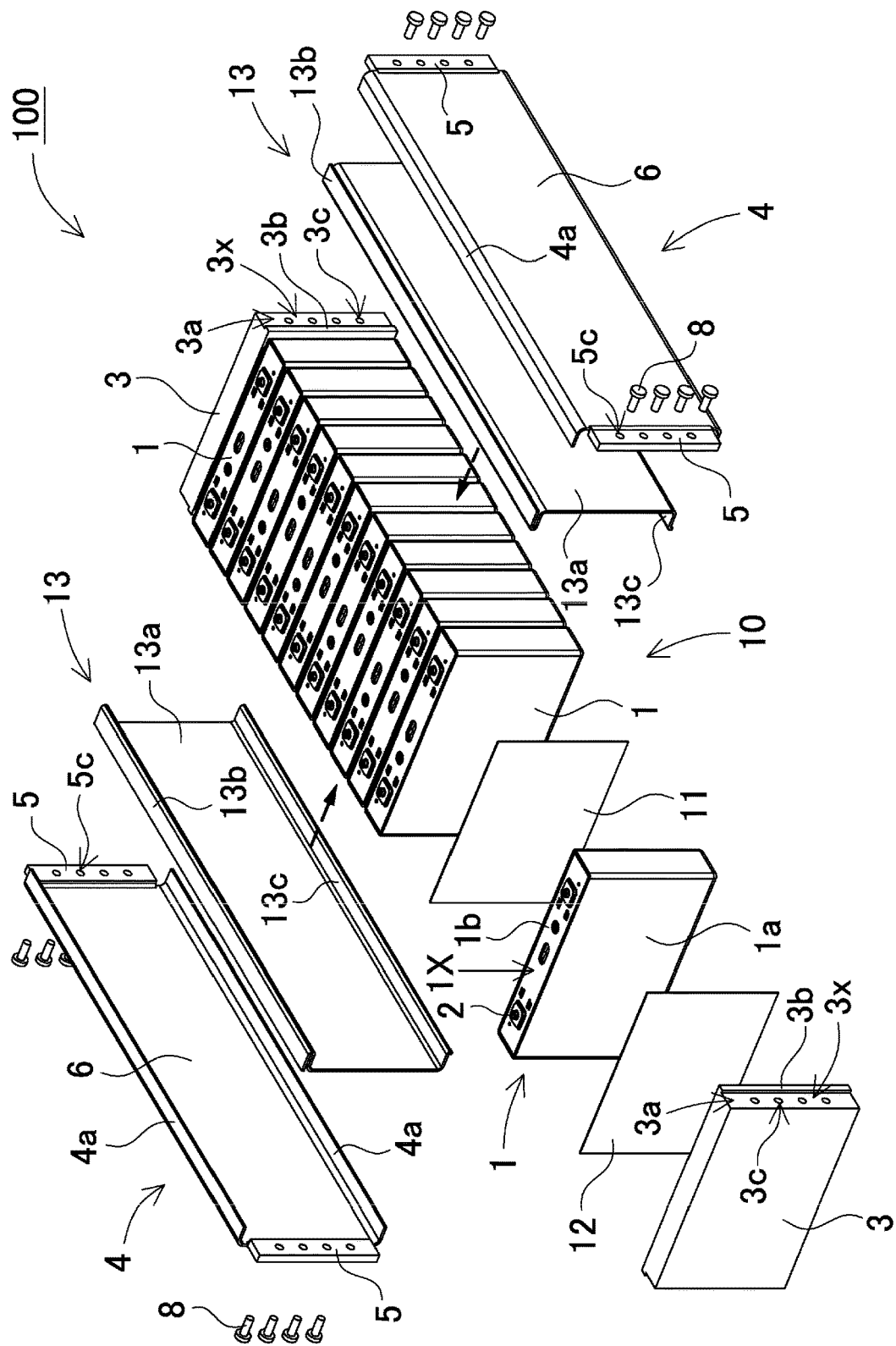
FIG. 2 is an exploded perspective view of the power supply device of FIG. 1.
Figure 3:
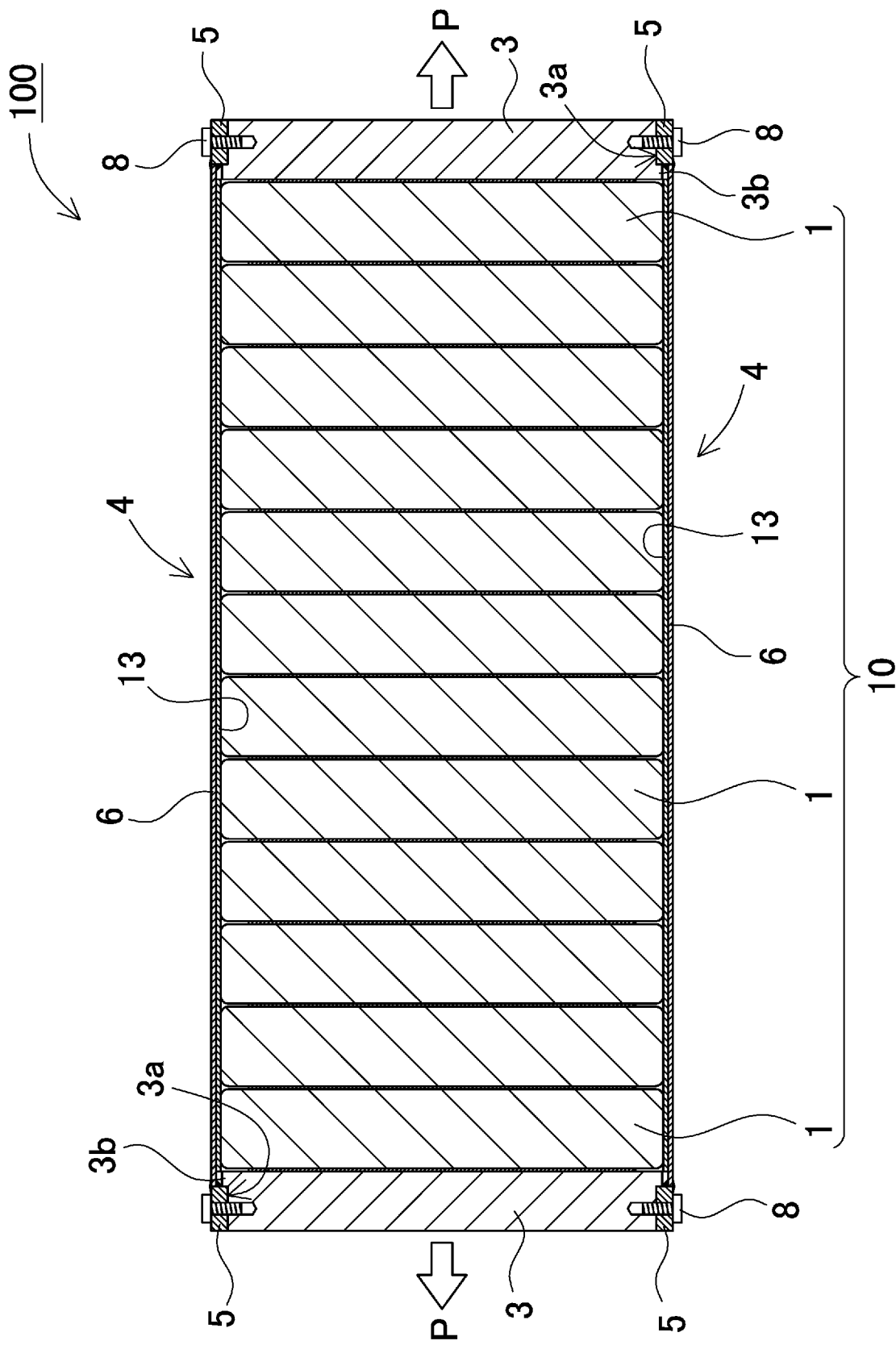
FIG. 3 is a horizontal cross-sectional view taken along line III-III of the power supply device of FIG. 1.
Figure 4:
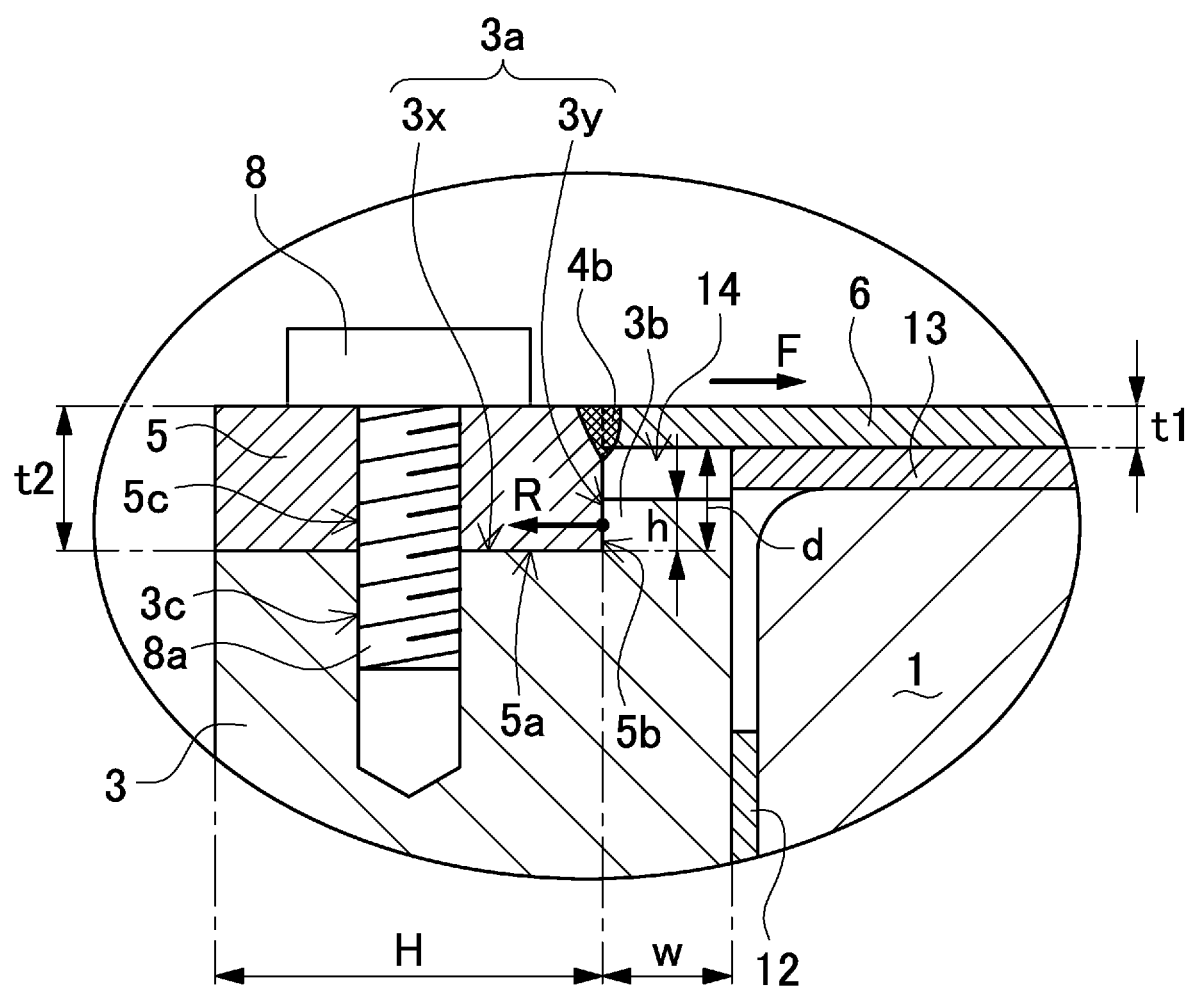
FIG. 4 is an enlarged cross-sectional view of a main part showing a coupling structure between an end plate and a fastening member shown in FIG. 3.
Figure 5:
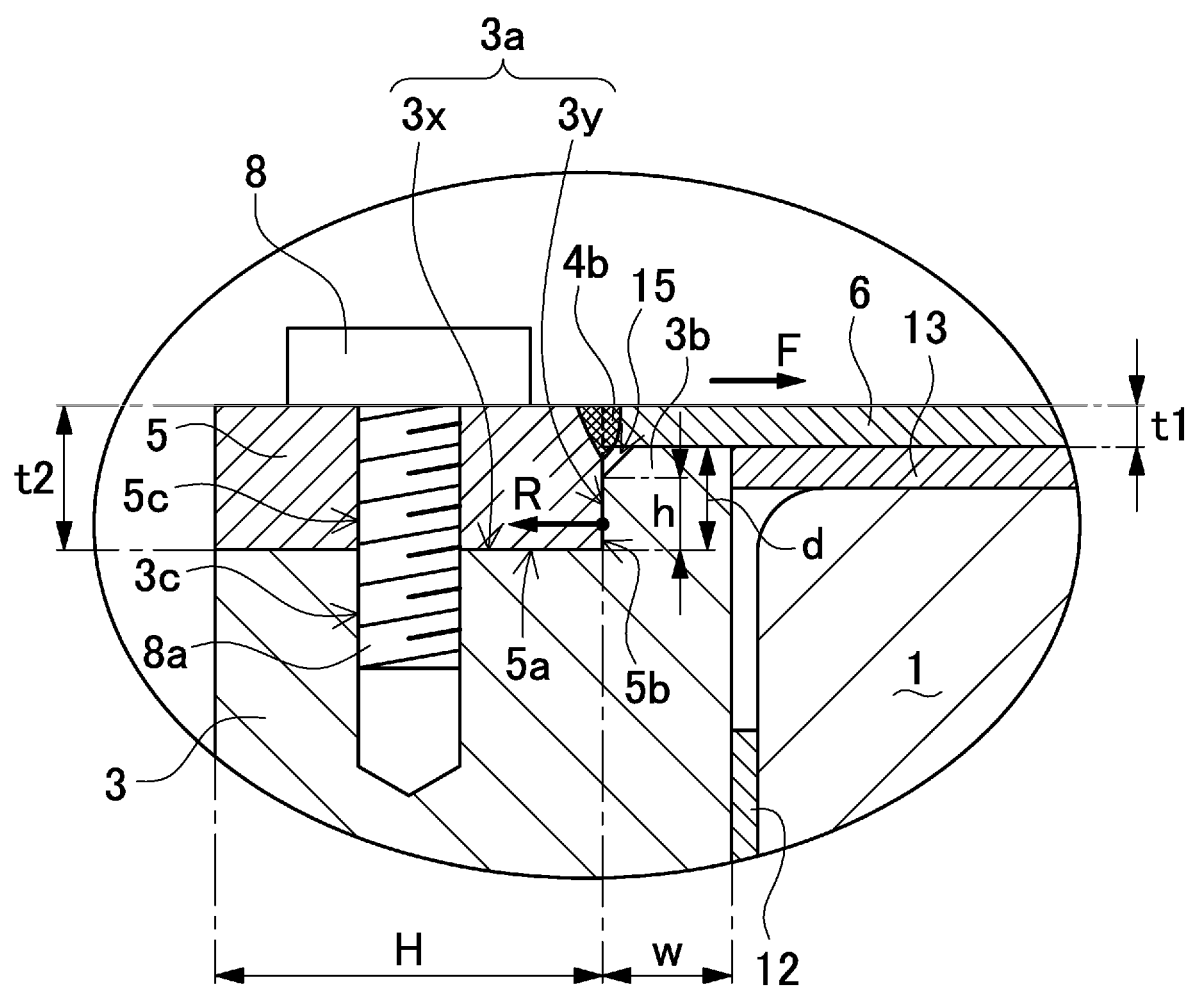
FIG. 5 is an enlarged cross-sectional view of a main part showing another example of the end plate.
Figure 6:
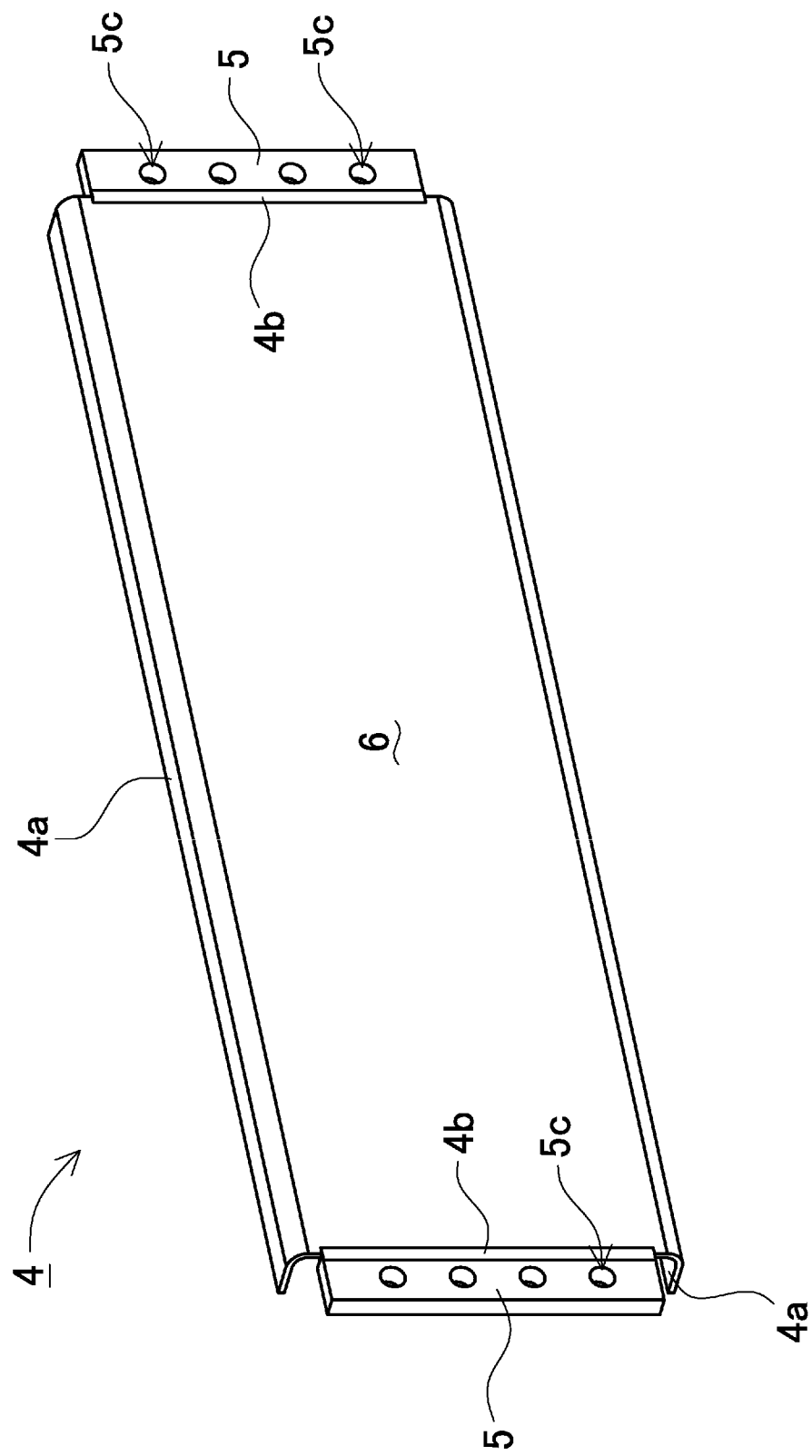
FIG. 6 is a perspective view showing the fastening member of FIG. 2.
Figure 7:
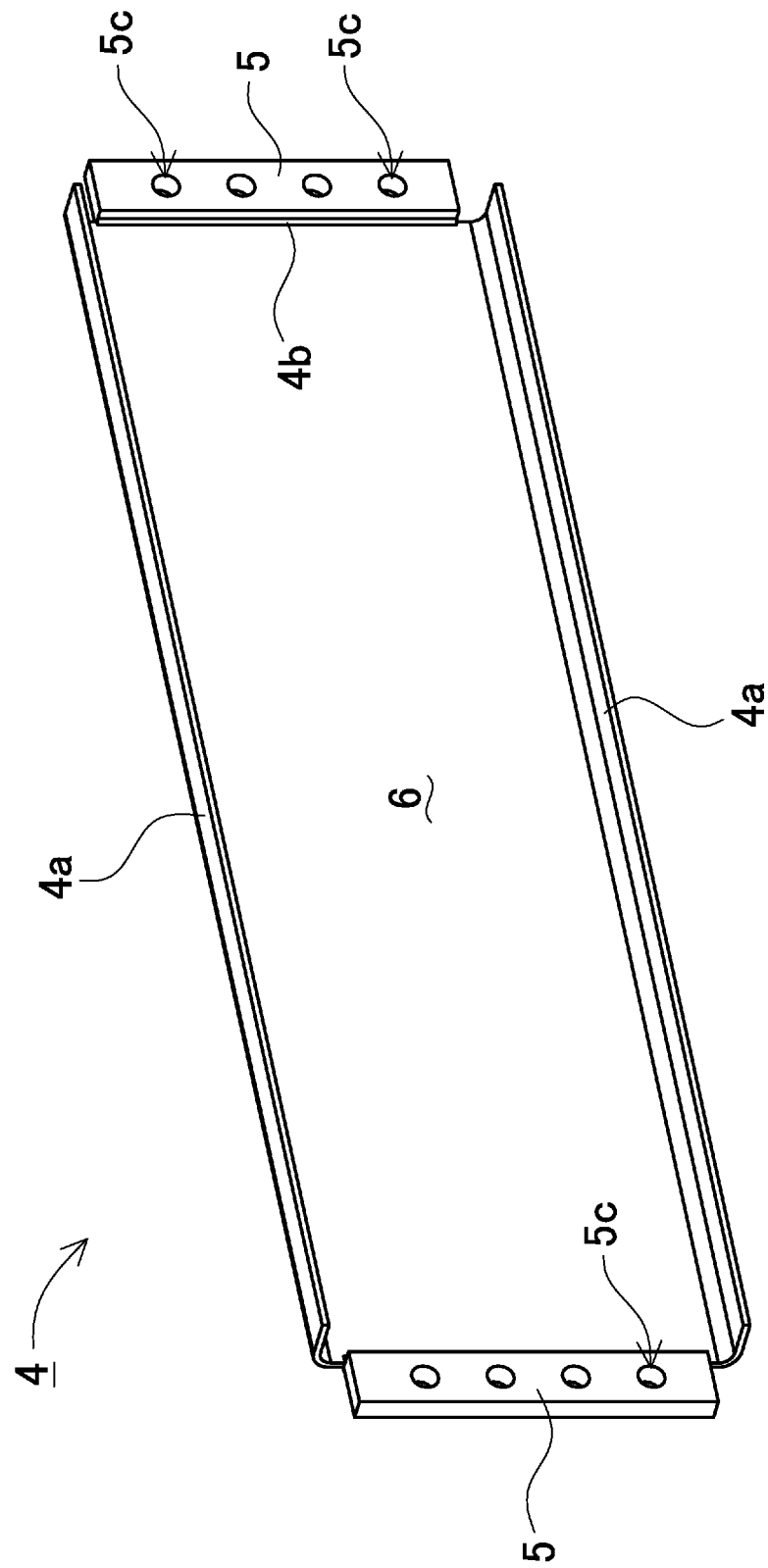
FIG. 7 is a perspective view of the fastening member of FIG. 5 as viewed from a rear surface.

FIG. 1 shows a perspective view of power supply device 100 according to a first exemplary embodiment of the present invention, FIG. 2 shows an exploded perspective view of power supply device 100, FIG. 3 shows a horizontal cross-sectional view taken along line III-III of power supply device 100 of FIG. 1, FIG. 4 shows an enlarged view of a main part of FIG. 3, FIG. 5 shows a perspective view showing fastening member 4 of FIG. 2, FIG. 6 shows a perspective view of fastening member 4 of FIG. 5 as viewed from the rear surface, and FIG. 7 shows a schematic view showing a manufacturing process of fastening member 4 of FIG. 5. Power supply device 100 shown in these figures includes battery stack body 10 in which the plurality of secondary battery cells 1 are stacked, the pair of end plates 3 covering both end surfaces of battery stack body 10 in the stack direction, and the plurality of fastening members 4 fastening end plates 3 to each other.

Battery stack body 10 includes a plurality of secondary battery cells 1 including positive and negative electrode terminals 2, and a bus bar (not illustrated) connected to electrode terminals 2 of the plurality of secondary battery cells 1 and connecting the plurality of secondary battery cells 1 in parallel and in series. The plurality of secondary battery cells 1 are connected in parallel and in series via these bus bars. The secondary battery cell 1 is a chargeable and dischargeable secondary battery. In power supply device 100, the plurality of secondary battery cells 1 are connected in parallel to constitute a parallel battery group, and a plurality of parallel battery groups are connected in series, so that a large number of secondary battery cells 1 are connected in parallel and in series. In power supply device 100 shown in FIGS. 1 to 3, the plurality of secondary battery cells 1 are stacked to form battery stack body 10. The pair of end plates 3 are disposed on both end surfaces of battery stack body 10. End parts of fastening members 4 are fixed to end plates 3, and secondary battery cells 1 in the stacked state are fixed into a pressurized state.

(Secondary Battery Cell 1)

Secondary battery cell 1 is a prismatic battery with a quadrangular outer shape of the main surface, which is a wide surface, and has a thickness smaller than the width. Furthermore, secondary battery cell 1 is a secondary battery that can be charged and discharged, and is a lithium ion secondary battery. However, the present invention does not specify the secondary battery cell to a prismatic battery, and also does not specify the secondary battery cell to a lithium ion secondary battery. As the secondary battery cell, it is also possible to use any chargeable battery such as a non-aqueous electrolyte secondary battery and a nickel-metal hydride secondary battery cell other than the lithium ion secondary battery.

As shown in FIG. 2, in secondary battery cell 1, an electrode body in which positive and negative electrode plates are stacked is housed in exterior can 1*a*, and filled with an electrolytic solution to airtightly seal exterior can 1*a*. Exterior can 1*a* is molded into a bottomed rectangular tubular shape, and an upper opening is airtightly closed with sealing plate 1*b* of a metal plate. Exterior can 1*a* is manufactured by deep-drawing a metal plate such as aluminum or an aluminum alloy. Sealing plate 1*b* is made of a metal plate such as aluminum or an aluminum alloy in the same manner as exterior can 1*a*. Sealing plate 1*b* is inserted into an opening of exterior can 1*a*. A boundary between an outer periphery of sealing plate 1*b* and an inner periphery of exterior can 1*a* is irradiated with laser light, and sealing plate 1*b* is airtightly fixed to exterior can 1*a* by laser welding.

(Electrode Terminal 2)

In secondary battery cell 1, positive and negative electrode terminals 2 are fixed to both ends of terminal surface 1X with sealing plate 1*b*, which is a top surface, being used as terminal surface 1X. A projection part of electrode terminal 2 has a columnar shape. However, the projection part is not necessarily a column, and may be a polygonal prism or an elliptic column.

The positions of positive and negative electrode terminals 2 to be fixed to sealing plate 1*b* of secondary battery cell 1 are the positions where the positive electrode and the negative electrode become bilaterally symmetrical. Thus, secondary battery cells 1 are laterally inverted and stacked, and electrode terminals 2 of the positive electrode and the negative electrode that are adjacent and close to each other are connected by a bus bar, so that adjacent secondary battery cells 1 can be connected in series.

(Battery Stack Body 10)

The plurality of secondary battery cells 1 are stacked such that the thickness direction of each secondary battery cell 1 is the stack direction to constitute battery stack body 10. In battery stack body 10, the plurality of secondary battery cells 1 are stacked such that terminal surface 1X on which positive and negative electrode terminals 2 are provided, and sealing plate 1*b* in FIG. 2 are on the same plane.

In battery stack body 10, insulating spacer 11 may be interposed between secondary battery cells 1 stacked adjacent to each other. Insulating spacer 11 is an insulating material made of resin or the like manufactured in a thin plate shape or a sheet shape. Insulating spacer 11 has a plate shape having substantially the same size as the opposing surface of secondary battery cell 1. Insulating spacer 11 is stacked between secondary battery cells 1 adjacent to each other, whereby adjacent secondary battery cells 1 can be insulated from each other. As the spacer disposed between adjacent secondary battery cells 1, it is also possible to use a spacer having a shape in which a flow path of a cooling gas is formed between secondary battery cells 1 and the spacer.

In addition, the surface of the secondary battery cell 1 can be covered with an insulating material. For example, the surface of the exterior can excluding the electrode part of the secondary battery cell may be thermally welded with a shrink tube such as a polyethylene terephthalate (PET) resin. In this case, the insulating spacer may be omitted. Furthermore, in a power supply device in which a plurality of secondary battery cells are connected in massively parallel and massively series, insulating spacers are interposed between the secondary battery cells connected in series to insulate therebetween. On the other hand, in between the secondary battery cells connected in parallel, a voltage difference does not occur between adjacent exterior cans, and thus the insulating spacer between these secondary battery cells can be omitted.

Furthermore, in power supply device 100 shown in FIG. 2, end plates 3 are disposed on both end surfaces of battery stack body 10. End surface spacer 12 may be interposed between end plate 3 and battery stack body 10 to insulate end plate and battery stack body from each other. End surface spacer 12 can also be an insulating material made of resin or the like manufactured in a thin plate shape or a sheet shape.

In battery stack body 10, a metal bus bar is connected to positive and negative electrode terminals 2 of adjacent secondary battery cells 1, and the plurality of secondary battery cells 1 are connected in parallel and in series via this bus bar. In battery stack body 10, for a plurality of secondary battery cells 1 connected in parallel to each other to constitute a parallel battery group, the plurality of secondary battery cells 1 are stacked such that positive and negative electrode terminals 2 provided at both end parts of terminal surface 1X are in the same right and left orientation, and for secondary battery cells 1 constituting a parallel battery group connected in series to each other, the plurality of secondary battery cells 1 are stacked such that positive and negative electrode terminals 2 provided at both end parts of terminal surface 1X are in opposite right and left orientations. However, the present invention does not specify a number of secondary battery cells constituting the battery stack body and the connection state thereof. The number of secondary battery cells constituting the battery stack body and the connection state thereof can be variously changed including other exemplary embodiments to be described later.

In power supply device 100 according to the exemplary embodiment, in battery stack body 10 in which the plurality of secondary battery cells 1 are stacked on each other, electrode terminals 2 of the plurality of secondary battery cells 1 adjacent to each other are connected by a bus bar, and the plurality of secondary battery cells 1 are connected in parallel and in series. A bus bar holder may be disposed between battery stack body 10 and the bus bar. By using the bus bar holder, a plurality of bus bars can be disposed at fixed positions on the upper surface of the battery stack body while insulating the plurality of bus bars from each other and insulating the terminal surfaces of the secondary battery cells and the bus bars.

(Bus Bar)

A metal plate is cut and processed, and thus the bus bar is manufactured into a predetermined shape. As the metal plate constituting the bus bar, a metal having low electric resistance and light weight, for example, an aluminum plate, a copper plate, or an alloy thereof can be used. However, as the metal plate of the bus bar, other metals having small electric resistance and light weight or alloys thereof can also be used.

(End Plate 3)

As shown in FIGS. 1 to 3, end plates 3 are disposed to both end parts of battery stack body 10 and fastened via a pair of right and left fastening members 4 disposed along both side surfaces of battery stack body 10. The outer shape of end plate 3 is substantially equal to or slightly larger than the outer shape of secondary battery cell 1, and is a quadrangular plate member in which fastening members 4 are fixed to the outer peripheral surfaces on both sides to suppress expansion of battery stack body 10. Entire end plate 3 is made of metal such as aluminum, an aluminum alloy, SUS, or iron. However, although not illustrated, the end plate may have a structure in which a metal plate is stacked on plastic, or may be a fiber-reinforced resin molded plate in which reinforcing fibers are entirely embedded.

End plate 3 is in close contact with the surface of secondary battery cells 1 via end surface spacer 12 in a surface contact state to hold secondary battery cells 1. In power supply device 100, in the assembly process, end plates 3 are disposed at both end parts of battery stack body 10, end plates 3 at both ends are pressurized by a press (not illustrated), secondary battery cells 1 are held in a pressurized state in the stack direction, and in this state, fastening members 4 are fixed to end plates 3. After end plate 3 is fixed to fastening member 4, the pressurized state of the press is released.

End plate 3 is fixed to fastening member 4 and receives expansion force P of battery stack body 10 to hold secondary battery cells 1. As shown in the enlarged cross-sectional view of FIG. 4, end plate 3 is provided with fitting portions 3a for guiding locking block 5 provided on fastening member 4 in order to reliably couple locking block 5 provided on fastening member 4 to be fixed. Furthermore, end plate 3 is provided with stopper portion 3b that abuts on locking block 5 on a part close to battery stack body 10 of fitting portion 3a. In other words, both side surfaces of end plate 3 are each provided with stopper portion 3b protruding from the end part close to battery stack body 10 toward fastening member 4, and provided with fitting portion 3a having a step shape. As shown in FIGS. 2 to 4, end plate 3 is provided with a plurality of female screw holes 3c on bottom surface 3x of fitting portion 3a.

End plate 3 receives, from battery stack body 10, expansion force P, which is generated by expansion of secondary battery cells 1 and likely to expand in the battery stack direction. At this time, locking block 5 of fastening member 4 coupled to end plate 3 receives pressing force R that presses locking block 5 outward in the battery stack direction at a contact part with stopper portion 3b. Thus, strong tensile force F acts on fastening member 4 as a reaction of pressing force R acting on locking block 5. End plate 3 is held in a fastened state while resisting expansion force P of secondary battery cells 1 by suppressing locking block 5 from moving by tensile force F of fastening member 4, due to contact between stopper portion 3b and locking block 5. Stopper portion 3b has a lateral width that is not deformed by tensile force F of fastening member 4 acting on the contact part with locking block 5. Lateral width (w) of stopper portion 3b is set to an optimum value in consideration of tensile force F of fastening member 4. For example, assuming that entire end plate 3 is made of aluminum, lateral width (w) is set to equal to or greater than 3 mm, preferably equal to or greater than 4 mm, more preferably equal to or greater than 5 mm, and optimally equal to or greater than 8 mm. The maximum shear force that the material withstands is considerably stronger than the maximum bending force. By setting lateral width (w) of stopper portion 3b to be in the above-mentioned range, tensile force F of fastening member 4 is supported by the shear stress of stopper portion 3b to prevent deformation of stopper portion 3b.

Furthermore, in end plate 3 shown in FIG. 4, height (h) of stopper portion 3b is made smaller than protrusion amount (d) of the locking block, and gap 14 is provided between the tip end surface of stopper portion 3b and the inner surface of fastening member 4. In this structure, tip end surface 5a of locking block 5 is brought into close contact with the side surface of end plate 3 that becomes bottom surface 3x of fitting portion 3a, and locking surface 5b of locking block 5 can be reliably abutted on support surface 3y of stopper portion 3b. However, as shown in FIG. 5, in end plate 3, height (h) of stopper portion 3b can be made equal to protrusion amount (d) of locking block 5. In this case, the tip end surface of stopper portion 3b can be disposed close to the inner surface of fastening member 4. Stopper portion 3b of end plate 3 shown in FIG. 5 is a corner part on the tip end, and the corner part facing locking block 5 is cut off to provide gap 15. This structure is characterized in that by providing gap 15 at a position facing the corner part on the rear end of locking block 5, the joining part between plate-shaped bar 6 and locking block 5 can be disposed in a non-contact state with respect to stopper portion 3b. As described above, height (h) of stopper portion 3b is specified in consideration of the protrusion amount (d) of locking block 5 and the gap formed between the tip end surface of stopper portion 3b and the inner surface of fastening member 4.

(Fastening Member 4)

Both ends of fastening member 4 are fixed to end plates 3 disposed on both end surfaces of battery stack body 10. The pair of end plates 3 are fixed by the plurality of fastening members 4, whereby battery stack body 10 is fastened in the stack direction. As shown in FIGS. 6 and 7, fastening member 4 includes plate-shaped bar 6 extended in the stack direction of battery stack body 10, and locking blocks 5 fixed to both ends in the longer direction of plate-shaped bar 6. Plate-shaped bar 6 is disposed to face both side surfaces of battery stack body 10, and locking block 5 is guided and fixed to fitting portion 3a provided on an outer peripheral surface of end plate 3.

(Plate-Shaped Bar 6)

Plate-shaped bar 6 is a metal plate having a predetermined width and a predetermined thickness along the side surface of battery stack body 10. As plate-shaped bar 6, a metal plate that withstands strong tensile force F is used. By forming plate-shaped bar 6 to be thin with the thickness of 1 mm to 2 mm, for example, it is possible to achieve stretchability while achieving the strength to withstand tensile force F acting on fastening member 4. In fastening member 4 of FIG. 2, plate-shaped bar 6 disposed on one side of battery stack body 10 is a metal plate having a vertical width covering the side surface of battery stack body 10.

(Locking Block 5)

As shown in FIGS. 6 and 7, locking block 5 is made of a plate-like or prismatic metal having a predetermined thickness, and is disposed to face both end surfaces of plate-shaped bar 6 in the longer direction. Locking block 5 is formed to be thicker than plate-shaped bar 6, and is joined and fixed to the end surface of plate-shaped bar 6. Locking block 5 formed thicker than plate-shaped bar 6 is joined to the end surface of plate-shaped bar 6 so as to protrude toward the outer peripheral surface of end plate 3 relative to the inner side surface of plate-shaped bar 6 in a state of being fixed to both ends of plate-shaped bar 6. The pair of locking blocks 5 fixed to both ends of plate-shaped bar 6 are provided along the outer surface of end plate 3, and have a size and shape to be guided to fitting portion 3a provided on the outer surface of end plate 3, and locked to stopper portion 3b. In a state where fastening member 4 is coupled to end plate 3, locking block 5 is guided to fitting portion 3a provided on end plate 3 and locked to stopper portion 3b, and fastening members 4 are disposed at fixed positions on both sides of battery stack body 10.

Thickness (t2) of locking block 5 is set to a thickness with which locking surface 5b facing stopper portion 3b can be reliably abutted on and supported by stopper portion 3b. In fastening member 4, as shown in the cross-sectional view of FIG. 4, thickness (t2) of locking block 5 is increased with respect to thickness (t1) of plate-shaped bar 6, and locking block 5 protrudes toward the inner surface side of plate-shaped bar 6. In particular, in fastening member 4 shown in FIG. 4, the joining part between plate-shaped bar 6 and locking block 5 has the same plane shape on the outer surface, and locking block 5b protrudes on the inner surface. As a result, locking block 5b is guided to fitting portion 3a of end plate 3 and locked to stopper portion 3b, thereby enhancing resistance to shear stress. In particular, by making the joint part between locking block 5 and plate-shaped bar 6 in the same plane, protrusion amount (d) of locking block 5b is specified as the difference between thickness (t2) of locking block 5 and thickness (t1) of plate-shaped bar 6.

Lateral width (H) of locking block 5 in the battery stack direction is set to a width that is not deformed by tensile force F acting on plate-shaped bar 6, for example, equal to or greater than 10 mm. By making lateral width (H) thicker than about 10 mm, locking block 5 can support, by the shear force, tensile force F acting on plate-shaped bar 6. From this, lateral width (H) of locking block 5 is set to equal to or greater than 10 mm, and tensile force F acting on plate-shaped bar 6 is supported by the shear force, so that sufficient strength can be achieved.

(Differential Thickness Material)

In fastening member 4 described above, plate-shaped bar 6 and locking block 5 are made of differential thickness materials that have different thicknesses. The differential thickness material is a material having a shape partially different in thickness of material. Specifically, a plurality of metal members (blanks) having different plate thicknesses are joined. As a joint method, various methods such as welding such as laser welding and MIG welding, friction pressure welding, electromagnetic welding, welding of ultrasonic joining, and brazing such as laser brazing and MIG brazing can be adopted. As a result, plate-shaped bar 6 and locking block 5 can be configured as separate members, and a thin member having high stretchability is allocated to plate-shaped bar 6, and a thick member having high rigidity is allocated to locking block 5, so that integrally joined fastening member 4 is obtained. In fastening member 4 shown in the figure, plate-shaped bar 6 is a metal plate thinner than locking block 5, and locking block 5 is a metal plate thicker than plate-shaped bar 6. With this structure, while rigidity of locking block 5 is enhanced to enhance the coupling strength with end plate 3, stretchability of plate-shaped bar 6 is enhanced to make it easier to deform at the time of expansion secondary battery cells 1.

Figure 8A:
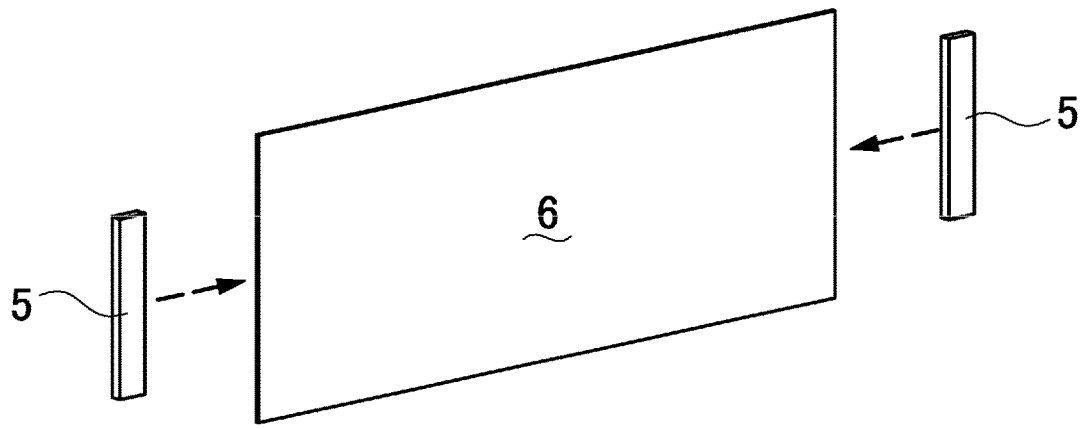
FIG. 8 is a schematic view showing a step of manufacturing the fastening member.
Figure 8B:
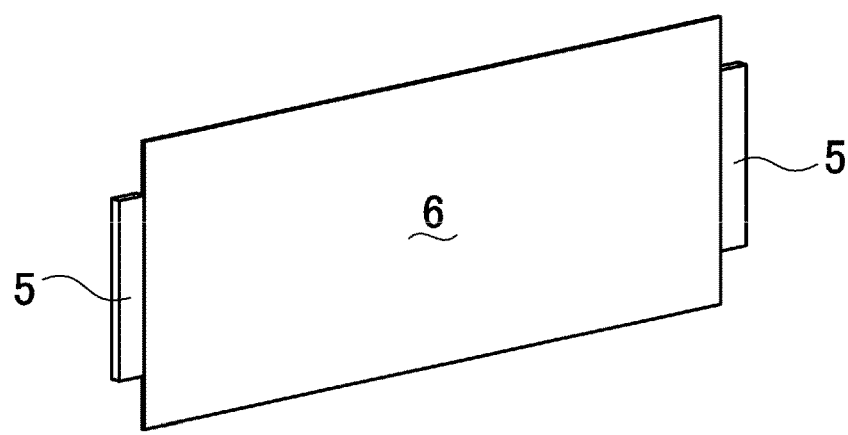
Figure 8C:
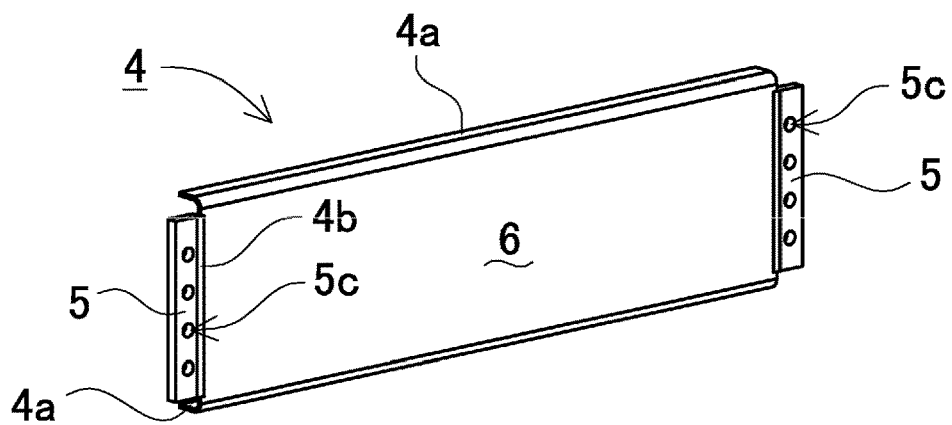

Hereinafter, a configuration in which a plurality of metal plates (blanks) having different plate thicknesses are laser-welded to form fastening member 4 will be described as an example. FIG. 8 shows a step of joining by laser welding the joint interface between plate-shaped bar 6 and locking block 5 to form fastening member 4. As shown in FIG. 8A, fastening member 4 is obtained by welding metal plates (blanks) having a constant material thickness, i.e., plate-shaped bar 6 and locking block 5 in the state of the development view in a state of being abutted against each other as shown in FIG. 8B, to obtain fastening member 4 as shown in FIG. 8C. In these welding, in particular, as shown in FIG. 8B, it is preferable to weld in a continuous linear manner. Specifically, the joint interface is welded in a state where the end surface of plate-shaped bar 6 and the side surface of locking block 5 abut against each other, and locking block 5 is joined to plate-shaped bar 6. Thus, in the structure in which locking block 5 is welded and fixed along the end surface of plate-shaped bar 6, locking block 5 and plate-shaped bar 6 have an integrated structure by joint portion 4b welded in a linear shape, and hence the joint part can be joined with a strong coupling strength.

In fastening member 4 shown in FIGS. 6 to 8, one side surface of locking block 5 facing the end surface of plate-shaped bar 6 is welded and joined to the end surface of plate-shaped bar 6 over the entire length direction. In this structure, the end surface of plate-shaped bar 6 and the side surface of locking block 5 are welded to each other in a continuous linear shape and in a substantially straight line at a joint interface between the end surface of plate-shaped bar 6 and the side surface of locking block 5. Thus, the structure in which the end surface of plate-shaped bar 6 is welded in a continuous line shape over the entire length of the side surface of locking block 5 has a feature that the coupling strength between locking block 5 and plate-shaped bar 6 is further enhanced, and locking block 5 and plate-shaped bar 6 can be reliably and uniformly joined. Such welding makes it possible to join metals to each other with higher reliability than that of spot welding or the like.

In fastening member 4 described above, a metal plate such as iron, preferably a steel plate, iron, an iron alloy, SUS, aluminum, an aluminum alloy, or the like can be used for plate-shaped bar 6 and locking block 5. Locking block 5 and plate-shaped bar 6 are preferably made of the same kind of metal. This can enhance the coupling strength while easily welding locking block 5 and plate-shaped bar 6.

However, in fastening member 4, plate-shaped bar 6 and locking block 5 can be formed of dissimilar metals. That is, fastening member 4 can also join and integrally couple locking block 5 and plate-shaped bar 6, which are differential thickness materials made of dissimilar metals. In this case, it is possible to enhance strength, for example, by using an iron-based metal for the locking block, and to enhance stretchability by using an aluminum-based metal plate for the plate-shaped bar. In addition, in the welding of the plate-shaped bar and the locking block made of dissimilar metals, a welding method that can suppressing thermal influence such as friction stir welding may be adopted instead of welding.

In addition, as shown in FIG. 4, it is preferable that fastening member 4 has an outer surface formed in the same plane at the joint part between plate-shaped bar 6 and locking block 5. Due to this, while fastening member 4 is formed of a plurality of members, the joining part between plate-shaped bar 6 and locking block 5 having different thicknesses can have a planar shape and a beautiful appearance without unevenness. Furthermore, on the inner side surface of fastening member 4, as shown in FIG. 4, locking block 5 can be caused to protrude by a predetermined protrusion amount with respect to the inner side surface of plate-shaped bar 6.

Furthermore, as shown in FIG. 8B, fastening member 4 is welded in the step of joining plate-shaped bar 6 and locking block 5, and then plate-shaped bar 6 is press-molded into a predetermined shape in the pressing step. Specifically, the upper and lower end edge parts of fastening member 4 shown in FIG. 8C are bent to form bent piece 4a. Upper and lower bent pieces 4a have shapes covering upper and lower surfaces of battery stack body 10 from corners on both right and left side surfaces of battery stack body 10. However, in the fastening member, after the upper and lower end edge parts of the plate-shaped bar are bent to form bent pieces, the locking blocks may be joined to both end surfaces of the plate-shaped bar.

As shown in FIGS. 3 and 4, fastening member 4 is fixed at a fixed position in a state where locking block 5 is guided to fitting portion 3a of end plate 3 and locking block 5 is locked to stopper portion 3b. Furthermore, locking block 5 is fixed to end plate 3 via bolt 8, and the pair of end plates 3 are coupled by fastening member 4.

Locking block 5 is provided with through hole 5c through which screw portion 8b of bolt 8 is inserted. Bolts 8 penetrate locking block 5 and are screwed into end plate 3 to fix locking block 5 to end plate 3. Power supply device 100 of this fixing structure can reliably block positional displacement of locking block 5 by both bolts 8 and stopper portion 3b while reliably fixing locking block 5 to end plate 3. This is because bolts 8 press and fix locking block 5 against bottom surface 3x of fitting portion 3a, stopper portion 3b can reliably block positional displacement, and the axial force of bolts 8 can also block the positional displacement.

Locking block 5 is fixed to end plate 3 by inserting screw portion 8a of bolt 8 into through hole 5c and screwing it into female screw hole 3c provided in end plate 3. In locking block 5 shown in the figure, through hole 5c is opened so as to coincide with female screw hole 3c provided in end plate 3 in a state where end plate 3 is fastened. Locking block 5 of FIG. 6 is provided with a plurality of through holes 5c opened at predetermined intervals in the longer direction that is in the vertical direction in the figure. Accordingly, the plurality of female screw holes 3c of end plate 3 are also formed along the side surface of end plate 3. The plurality of through holes 5c opened in locking block 5 are provided to face the plurality of female screw holes 3c opened on bottom surface 3x of fitting portion 3a of end plate 3. As shown in FIG. 2, locking block 5 is fixed to the outer peripheral surface of end plate 3 via the plurality of bolts 7.

Although not illustrated, locking block 5 may be provided with a recess part that guides the head of bolt 8 so that the head of bolt 8 does not protrude from the surface. This recess part may have a depth at which the head of bolt 8 does not protrude from the surface of locking block 5, or may have a depth at which the head of the bolt slightly protrudes.

As described above, the power supply device in which the large number of secondary battery cells 1 are stacked is configured to bind a plurality of secondary battery cells 1 by coupling, by fastening members 4, end plates 3 disposed at both ends of battery stack body 10 including the plurality of secondary battery cells 1. By binding the plurality of secondary battery cells 1 via highly rigid end plate 3 and fastening member 4, it is possible to suppress expansion, deformation, relative movement, malfunction due to vibration, and the like of secondary battery cells 1 due to charging and discharging and deterioration.

(Insulating Sheet 13)

Insulating sheet 13 is interposed between fastening member 4 and battery stack body 10. Insulating sheet 13 is made of a material having an insulating property, e.g., resin, and can insulate fastening member 4 made of metal from secondary battery cells 1. Insulating sheet 13 shown in FIG. 2 and the like includes flat plate portion 13a covering the side surface of battery stack body 10, and bent cover portions 13b, 13c provided above and below flat plate portion 13a, respectively. Bent cover portion 13b on the upper end is bent in an L-shape from flat plate portion 13a so as to cover bent piece 4a of fastening member 4, and then further folded back. Thus, by covering bent piece 4a with insulating bent cover portion 13b from the upper surface to the side surface and the lower surface, unintended conduction between secondary battery cells 1 and fastening member 4 can be avoided.

Power supply device 100 described above is assembled in the following process.

(1) A predetermined number of secondary battery cells 1 are stacked in the thickness of secondary battery cells 1 with insulating spacers 11 interposed therebetween to form battery stack body 10.

(2) End plates 3 are disposed at both ends of battery stack body 10, and the pair of end plates 3 are pressed from both sides by a press (not illustrated). Battery stack body 10 is pressurized by end plates 3 at a predetermined pressure, and secondary battery cells 1 are compressed and held in a pressurized state.

(3) In a state where battery stack body 10 is pressurized by end plates 3, fastening members 4 are coupled and fixed to the pair of end plates 3. Fastening member 4 is formed to be thicker than plate-shaped bar 6 on both end surfaces in the longer direction of plate-shaped bar 6 along the side surface of battery stack body 10, and locking block 5 is linearly joined to fastening member 4, so that locking block 5 is formed in a shape protruding relative to plate-shaped bar 6 on the inner surface of fastening member 4. Fastening member 4 is disposed such that locking blocks 5 at both ends are guided to fitting portions 3a of the pair of end plates 3, and fastening member 4 is fixed by screwing bolts 8 penetrating locking blocks 5 into female screw holes 3c of end plates 3. After fixing, the pressurized state is released. Accordingly, by the tensile force acting on fastening member 4, locking block 5 is held in a state of being locked to stopper portion 3b of end plate 3.

(4) Opposing electrode terminals 13 of secondary battery cells 1 adjacent to each other are coupled to each other by bus bars (not illustrated) on both side portions of battery stack body 10. The bus bar is fixed to electrode terminal 13 to connect battery cells 1 in series, or in series and in parallel. The bus bar is welded or screwed to electrode terminals 2 to be fixed to electrode terminals 2.

The power supply device described above can be used as a power supply for a vehicle that supplies electric power to a motor that causes an electric vehicle to travel. As an electric vehicle on which the power supply device is mounted, an electric vehicle such as a hybrid vehicle or a plug-in hybrid vehicle that travels by both an engine and a motor, or an electric vehicle that travels only by a motor can be used, and is used as a power supply for these vehicles. Note that, in order to obtain power for driving the vehicle, an example will be described in which a large number of the above-described power supply devices are connected in series or in parallel, and large-capacity, high-output power supply device 100 to which a necessary control circuit is further added is constructed.

(Power Supply Device for Hybrid Vehicle)

Figure 9:
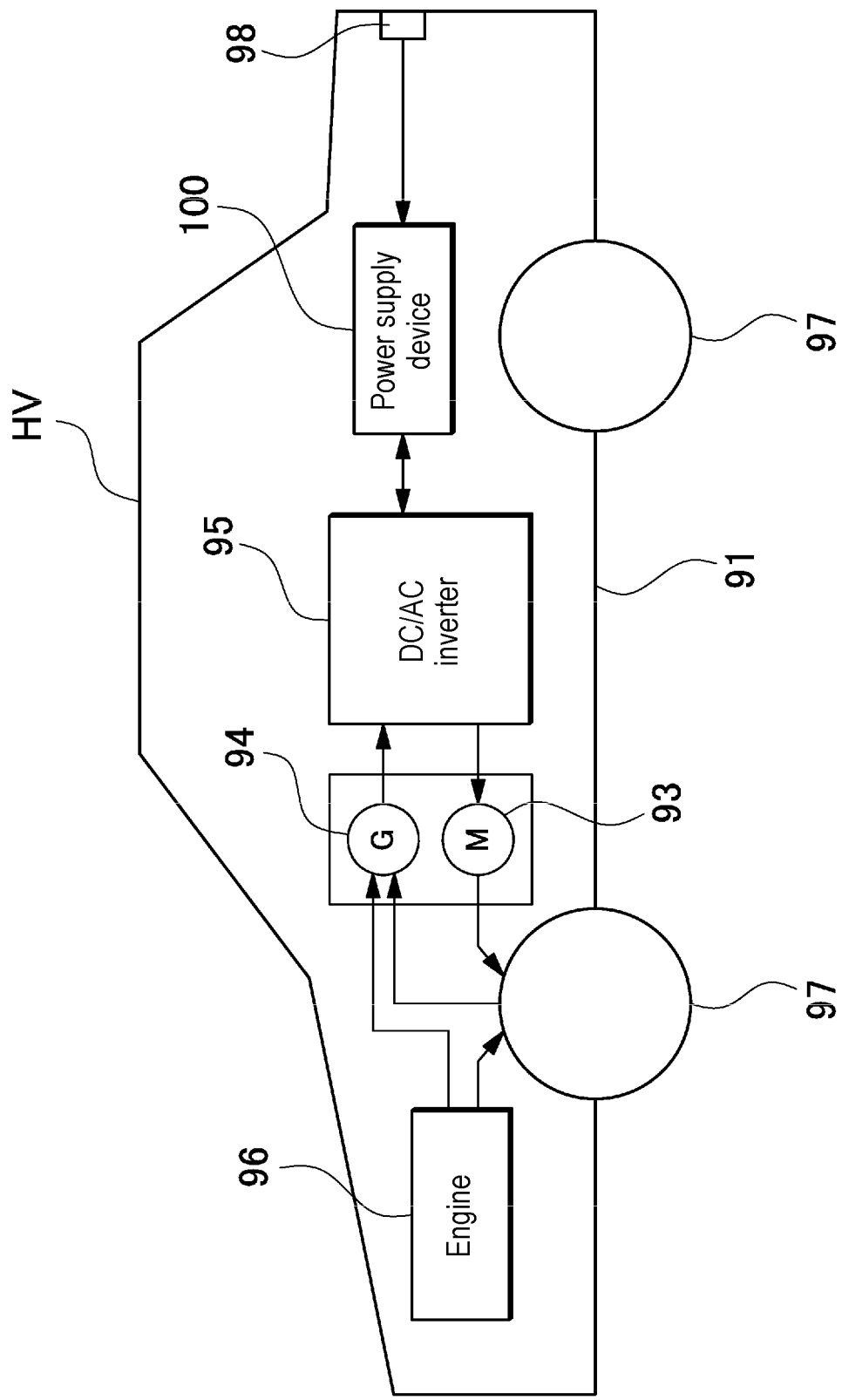
FIG. 9 is a block diagram showing an example in which the power supply device is mounted on a hybrid vehicle traveling by an engine and a motor.

FIG. 9 shows an example in which the power supply device is mounted on a hybrid vehicle that travels by both an engine and a motor. Vehicle HV on which the power supply device illustrated in this drawing is mounted includes vehicle body 91, engine 96 and traveling motor 93 that cause vehicle body 91 to travel, wheels 97 driven by engine 96 and traveling motor 93, power supply device 100 that supplies power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by power supplied from power supply device 100. Generator 94 is driven by engine 96 or by regenerative braking when braking the vehicle to charge the battery of power supply device 100. As shown in FIG. 9, vehicle HV may include charging plug 98 for charging power supply device 100. Power supply device 100 can be charged by connecting charging plug 98 to an external power supply.

(Power Supply Device for Electric Vehicle)

Figure 10:
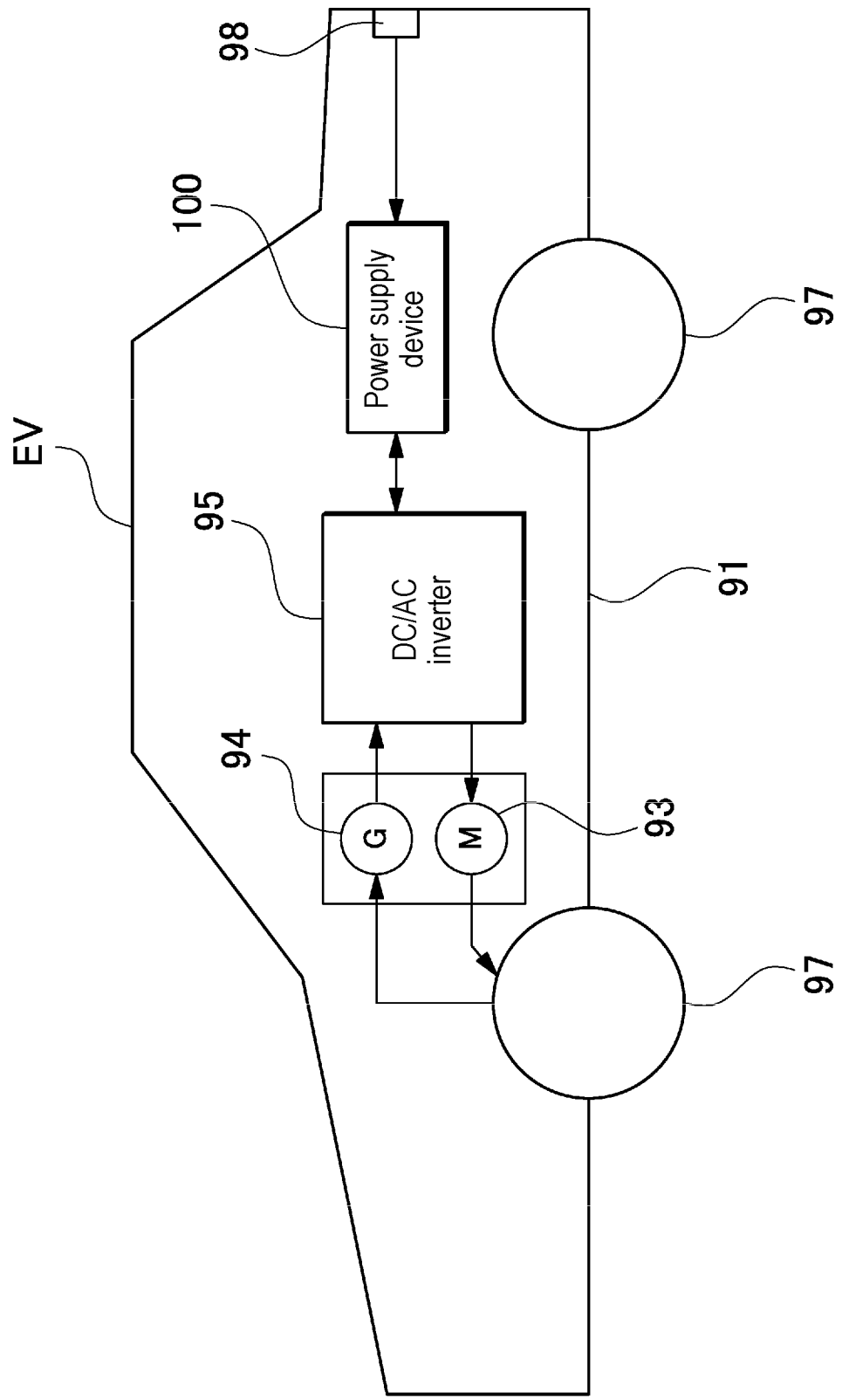
FIG. 10 is a block diagram showing an example in which the power supply device is mounted on an electric vehicle traveling only by a motor.

FIG. 10 shows an example in which the power supply device is mounted on an electric vehicle that travels only by a motor. Vehicle EV on which the power supply device illustrated in this drawing is mounted includes vehicle body 91, traveling motor 93 that causes vehicle body 91 to travel, wheels 97 driven by motor 93, power supply device 100 that supplies power to motor 93, and generator 94 that charges the battery of power supply device 100. Power supply device 100 is connected to motor 93 and generator 94 via DC/AC inverter 95. Motor 93 is driven by power supplied from power supply device 100. Generator 94 is driven by the energy at the time of regenerative braking of vehicle EV to charge the battery of power supply device 100. In addition, vehicle EV includes charging plug 98, and power supply device 100 can be charged by connecting charging plug 98 to an external power supply.

(Power Supply Device for Power Storage Device)

Furthermore, the present invention does not specify the application of the power supply device as the power supply for a motor that drives a vehicle. The power supply device according to the exemplary embodiments can also be used as a power supply for a power storage device that stores electricity by charging a battery with electric power generated by solar power generation, wind power generation, or the like. FIG. 11 shows a power storage device that stores electricity by charging the battery of power supply device 100 with solar cell 82.

The power storage device shown in FIG. 11 charges the battery of power supply device 100 with electric power generated by solar cell 82 disposed on a roof, a rooftop, or the like of building 81 such as a house or a factory. This power storage device charges the battery of power supply device 100 by charging circuit 83 using solar cell 82 as a charging power source, and then supplies electric power to load 86 via DC/AC inverter 85. Therefore, this power storage device includes a charging mode and a discharging mode. In the power storage device shown in the figure, DC/AC inverter 85 and charging circuit 83 are connected to power supply device 100 via discharging switch 87 and charging switch 84, respectively. ON/OFF of discharging switch 87 and charging switch 84 is switched by power supply controller 88 of the power storage device. In the charging mode, power supply controller 88 switches charging switch 84 to on and switches discharging switch 87 to off to permit charging from charging circuit 83 to power supply device 100. When the charging is completed and the battery is fully charged, or in a state where a capacity equal to or greater than a predetermined value is charged, power supply controller 88 turns off charging switch 84 and turns on discharging switch 87 to switch to the discharging mode, and permits discharge from power supply device 100 to load 86. Furthermore, it is also possible to simultaneously perform electric power supply to load 86 and charging of power supply device 100 by turning on charging switch 84 and turning on discharging switch 87 as necessary.

Furthermore, although not illustrated, the power supply device can also be used as a power supply for a power storage device that charges and stores a battery using midnight electric power at night. The power supply device charged with the midnight power can be charged with the midnight electric power, which is surplus power of the power plant, outputs power in the daytime when the power load becomes large, and limit the peak power in the daytime to be small. Furthermore, the power supply device can also be used as a power supply that charges with both the output of a solar cell and the midnight electric power. This power supply device can efficiently store electricity in consideration of weather and power consumption by effectively using both power generated by the solar cell and midnight electric power.

The power storage device as described above can be suitably used for applications such as a backup power supply device that can be mounted on a rack of a computer server, a backup power supply device for a wireless base station such as a mobile phone, a power supply for household or factory power storage, a power supply device combined with a solar cell such as a power supply for street lamps, and a backup power supply for traffic lights and traffic indicators for roads.

INDUSTRIAL APPLICABILITY

The power supply device and the electric vehicle and the power storage device using the same, the fastening member for the power supply device, the production method for the power supply device, and the production method for the fastening member for the power supply device according to the present invention can be suitably used as a large-current power supply used for a power supply of a motor for driving an electric vehicle such as a hybrid vehicle, a fuel cell vehicle, an electric vehicle, or an electric motorcycle. Examples thereof include power supply devices such as plug-in hybrid electric vehicles, hybrid electric vehicles, and electric vehicles that can switching between an electric vehicle (EV) traveling mode and a hybrid electric vehicle (HEV) traveling mode. The present invention can be appropriately used for applications such as a backup power supply device that can be mounted on a rack of a computer server, a backup power supply device for a wireless base station such as a mobile phone, a power supply for household or factory power storage, a power storage device combined with a solar cell such as a power supply for street lamps, and a backup power supply for traffic lights and the like.

REFERENCE MARKS IN THE DRAWINGS

100: power supply device
1: battery cell
1X: terminal surface
1a: exterior can
1b: sealing plate
2: electrode terminal
3: end plate
3a: fitting portion
3x: bottom surface
3y: support surface
3b: stopper portion
3c: female screw hole
4: fastening member
4a: bent piece
4b: joint portion
5: locking block
5a: tip end surface
5b: locking surface
5c: through hole
6: plate-shaped bar
8: bolt
8a: screw portion
10: battery stack body
11: insulating spacer
12: end surface spacer
13: insulating sheet
13a: flat plate portion
13b, 13c: bent cover portion
14: gap
15: gap
81: building
82: solar cell
83: charging circuit
84: charging switch
85: DC/AC inverter
86: load
87: discharge switch
88: power supply controller
91: vehicle body
93: motor
94: generator
95: DC/AC inverter
96: engine
97: wheel
98: charging plug
HV, EV: vehicle

The invention claimed is:
1. A power supply device comprising:
a battery stack body including a plurality of secondary battery cells each including a prismatic exterior can are stacked;
a pair of end plates covering both end surfaces of the battery stack body, the both ends surfaces being ends along stacking of the battery stack body; and
a plurality of fastening members each disposed on a corresponding one of side surfaces of the battery stack body to fasten the end plates to each other, the side surfaces facing each other, wherein
each of the plurality of fastening members includes
a plate-shaped bar being elongated along a stacking of the plurality of secondary battery cells, and
locking blocks fixed to both ends of the plate-shaped bar, the both ends being ends along a length of the plate-shaped bar,
each of the locking blocks is thicker than the plate-shaped bar, is joined to an end surface of the plate-shaped bar, and protrudes toward an outer peripheral surface of a corresponding one of the end plates relative to an inner surface of the plate-shaped bar,
each of the end plates includes:
a fitting portion on an outer peripheral surface of the end plate, the fitting portion guides a corresponding one of the locking blocks, and a stopper portion that abuts on the corresponding one of the locking blocks on a part close to the battery stack body of the fitting portion, each of the locking blocks is locked to the stopper portion of a corresponding one of the plurality of fastening members to fasten a corresponding one of the end plates with the corresponding one of the plurality of fastening members, and a joint part between each of the locking blocks and the plate-shaped bar is disposed in a same plane on an outer surface of a corresponding one of the plurality of fastening members.

2. The power supply device according to claim 1, wherein each of the locking blocks is joined to an end surface of the plate-shaped bar in a continuous linear shape.

3. The power supply device according to claim 2, wherein each of the locking blocks is joined to an end surface of the plate-shaped bar by laser welding or metal inert gas welding.

4. The power supply device according to claim 1, wherein each of the locking blocks is fixed to an outer peripheral surface of a corresponding one of the end plates via a plurality of bolts.

5. The power supply device according to claim 1, wherein the plate-shaped bar and each of the locking blocks are any of iron, an iron alloy, SUS, aluminum, an aluminum alloy.

6. The power supply device according to claim 1, wherein the plate-shaped bar is bent inward at one or both of upper and lower end edge parts, and bent pieces covering upper and lower surfaces of the battery stack body are disposed.

7. The power supply device according to claim 1, wherein each of the locking blocks is higher in rigidity than the plate-shaped bar, and the plate-shaped bar is higher in stretchability than each of the locking blocks.

8. An electric vehicle including the power supply device according to claim 1, the electric vehicle comprising:

the power supply device;

a motor for traveling being supplied electric power from the power source device;

a vehicle body mounting the power supply device and the motor; and a wheel driven by the motor to cause the vehicle body to travel.

9. A power storage device including the power supply device according to claim 1, the power storage device comprising:

the power supply device; and a power supply controller that controls charging and discharging of the power supply device, wherein the power supply controller enables charging of the plurality of secondary battery cells by external electric power and cause the plurality of secondary battery cells to charge.

10. A method of manufacturing a power supply device including a battery stack body including a plurality of secondary battery cells each including a prismatic exterior can are stacked, a pair of end plates covering both end surfaces of the battery stack body, the both ends surfaces being ends along stacking of the battery stack body; and a plurality of fastening members each disposed on a corresponding one of side surfaces of the battery stack body to fasten the end plates to each other, the side surfaces facing each other, the method of steps comprising:

obtaining the plurality of fastening members by linearly joining locking blocks formed to be thicker than a plate-shaped bar on both ends, the both ends being ends along a length of the plate-shaped bar, the plate-shaped bar being elongated along stacking of the secondary battery cells; and covering both end surfaces of the battery stack body with a pair of end plates including a stopper portion for locking each of the locking blocks is formed, and fastening the end plates to each other by the plurality of fastening members.

11. The method of manufacturing the power supply device according to claim 10, wherein during obtaining the plurality of fastening members, joining, by welding, each of the locking blocks to an end surface of the plate-shaped bar.

12. A power supply device comprising:

a battery stack body including a plurality of secondary battery cells each including a prismatic exterior can are stacked;

a pair of end plates covering both end surfaces of the battery stack body, the both ends surfaces being ends along stacking of the battery stack body; and a plurality of fastening members each disposed on a corresponding one of side surfaces of the battery stack body to fasten the end plates to each other, the side surfaces facing each other, wherein each of the plurality of fastening members includes a plate-shaped bar being elongated along a stacking of the plurality of secondary battery cells, and locking blocks fixed to both ends of the plate-shaped bar, the both ends being ends along a length of the plate-shaped bar, each of the locking blocks is thicker than the plate-shaped bar, is joined to an end surface of the plate-shaped bar, and protrudes toward an outer peripheral surface of a corresponding one of the end plates relative to an inner surface of the plate-shaped bar, each of the end plates includes:

a fitting portion on an outer peripheral surface of the end plate, the fitting portion guides a corresponding one of the locking blocks, and a stopper portion that abuts on the corresponding one of the locking blocks on a part close to the battery stack body of the fitting portion, each of the locking blocks is locked to the stopper portion of a corresponding one of the plurality of fastening members to fasten a corresponding one of the end plates with the corresponding one of the plurality of fastening members, a protrusion amount (d) of each of the locking blocks with respect to an inner surface of the plate-shaped bar is larger than a height (h) of the stopper portion, and a gap is disposed between a tip end surface of the stopper portion and an inner surface of the plate-shaped bar.

13. The power supply device according to claim 12, wherein each of the locking blocks is joined to an end surface of the plate-shaped bar in a continuous linear shape.

14. The power supply device according to claim 13, wherein each of the locking blocks is joined to an end surface of the plate-shaped bar by laser welding or metal inert gas welding.

15. The power supply device according to claim 12, wherein each of the locking blocks is fixed to an outer peripheral surface of a corresponding one of the end plates via a plurality of bolts.

16. The power supply device according to claim 12, wherein the plate-shaped bar and each of the locking blocks are any of iron, an iron alloy, SUS, aluminum, an aluminum alloy.

17. The power supply device according to claim 12, wherein
the plate-shaped bar is bent inward at one or both of upper and lower end edge parts, and
bent pieces covering upper and lower surfaces of the battery stack body are disposed.

18. The power supply device according to claim 12, wherein
each of the locking blocks is higher in rigidity than the plate-shaped bar, and
the plate-shaped bar is higher in stretchability than each of the locking blocks.

19. An electric vehicle including the power supply device according to claim 12, the electric vehicle comprising:
the power supply device;
a motor for traveling being supplied electric power from the power source device;
a vehicle body mounting the power supply device and the motor; and
a wheel driven by the motor to cause the vehicle body to travel.

20. A power storage device including the power supply device according to claim 14, the power storage device comprising:
the power supply device; and
a power supply controller that controls charging and discharging of the power supply device, wherein the power supply controller enables charging of the plurality of secondary battery cells by external electric power and cause the plurality of secondary battery cells to charge.

* * * * *